United States Patent
Lampinen (10) Patent No.: US 9,564,776 B2
(45) Date of Patent: Feb. 7, 2017

(54) DETERMINING PRESENCE OF A MAGNET FOR CONTROLLING WIRELESS CHARGING

(71) Applicant: NOKIA CORPORATION, Espoo (FI)

(72) Inventor: Harri Armas Lampinen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 1073 days.

(21) Appl. No.: 13/670,742

(22) Filed: Nov. 7, 2012

(65) Prior Publication Data

US 2014/0125276 A1 May 8, 2014

(51) Int. Cl.
*H02J 7/00* (2006.01)
*H02J 17/00* (2006.01)
*H02J 5/00* (2016.01)
*H02J 7/02* (2016.01)

(52) U.S. Cl.
CPC ............... *H02J 17/00* (2013.01); *H02J 5/005* (2013.01); *H02J 7/025* (2013.01)

(58) Field of Classification Search
CPC ...................................................... H02J 17/00
USPC ........................................................ 320/108
See application file for complete search history.

(56) References Cited

U.S. PATENT DOCUMENTS

| | | | | |
|---|---|---|---|---|
| 8,981,598 B2 * | 3/2015 | Azancot | ................ | H02J 5/005 307/104 |
| 9,071,077 B2 * | 6/2015 | Eastlack | ................ | H02J 5/005 |
| 2010/0201315 A1 * | 8/2010 | Oshimi | ................ | H02J 7/025 320/108 |
| 2011/0309792 A1 * | 12/2011 | Mochida | ................ | H02J 7/025 320/108 |
| 2016/0056664 A1 * | 2/2016 | Partovi | ................ | H02J 7/025 307/104 |

FOREIGN PATENT DOCUMENTS

WO 2011/156768 12/2011
WO 2012/061246 5/2012

OTHER PUBLICATIONS

Lillie, Doug, New IWAS-3827EC-50 Wireless Charging Receiving Coil, Vishay Dale, Inductors, Jul. 2012, 2 pages.
Wireless Power Planet, Take Charge When Creating A Qi-Compliant Wireless Power Accessory, Sep. 13, 2011, 9 pages.
System Description Wireless Power Transfer, vol. 1: Low Power, Part 1: Interface Definition, Version 1.1, Wireless Power Consortium, Mar. 2002, 128 pages.

* cited by examiner

*Primary Examiner* — Richard V Muralidar
(74) *Attorney, Agent, or Firm* — Banner & Witcoff, Ltd.

(57) ABSTRACT

A device may measure or detect, using at least one magnetic sensor, a magnetic field to determine whether a magnet is included within a charging device. In some examples, the device may include a receiving coil for charging of a battery based on magnetic induction. In response to determining that a magnet is present within the charging device, the device may instruct the charging device to adjust an amount of electrical current supplied to a transmitting coil.

22 Claims, 5 Drawing Sheets

DETERMINING PRESENCE OF A MAGNET FOR CONTROLLING WIRELESS CHARGING

BACKGROUND

In various existing charging schemes, a wireless device may be placed on a charging pad and a battery of the wireless device may be wirelessly charged through magnetic induction. In magnetic induction a time-varying magnetic flux may induce an electromotive force to a closed conductor loop. Vice versa, a time-varying current may create a varying magnetic flux. In transformers, this phenomenon can be utilized to transfer energy wirelessly from circuit to another via inductively coupled coils. A primary coil transforms an alternating current into a varying magnetic flux, which may be arranged to flow through the secondary coil. The varying magnetic flux may then induce an alternating voltage over the secondary coil. The wireless device may include a ferrite shield designed to protect electronic components within the device (e.g., battery, chassis, printed writing board, etc.) from a magnetic field generated by the charging pad. These shields, however, often do not function as intended. In some instances, wireless charging pads have been known to saturate the ferrite shields resulting in undesired power leakage inside the wireless device. Power leakage may result in undesired heating of certain portions of the wireless device due to, for instance, induced eddy currents within metal or other conductive structures of the device. In some instances, the battery of the device can heat up due to the eddy currents and may even endanger the user. One way to try to avoid power leakage is to increase the thickness of the ferrite shield. This solution, however, may require increasing the thickness of the wireless device, thus preventing manufacture of a device that is slim.

SUMMARY

This Summary is provided to introduce a selection of concepts in a simplified form that are further described below in the Detailed Description. This Summary is not intended to identify key or essential features of the invention.

Embodiments include, without limitation, methods and devices for detecting or measuring a magnetic field to determine whether a magnet is included within a charging device. In some examples, a device may include a receiving coil for charging of a battery based on magnetic induction. In response to determining that a magnet is present within the charging device, the device may instruct the charging device to adjust an amount of electrical current supplied to a transmitting coil to reduce the likelihood of saturating a ferrite shield of the device. Embodiments additionally include, without limitation, non-transitory machine-readable media storing instructions that, when executed, cause a device and/or system to perform such methods, and machine-readable media storing instructions that, when executed, cause a device and/or system to perform such methods.

Additional embodiments are disclosed herein.

BRIEF DESCRIPTION OF THE DRAWINGS

Some embodiments are illustrated by way of example, and not by way of limitation, in the figures of the accompanying drawings and in which like reference numerals refer to similar elements.

DETAILED DESCRIPTION

In the following description of various embodiments, reference is made to the accompanying drawings, which form a part hereof, and in which various embodiments are shown by way of illustration. It is to be understood that there are other embodiments and that structural and functional modifications may be made. Embodiments of the present invention may take physical form in certain parts and steps, examples of which will be described in detail in the following description and illustrated in the accompanying drawings that form a part hereof.

Figure 1:
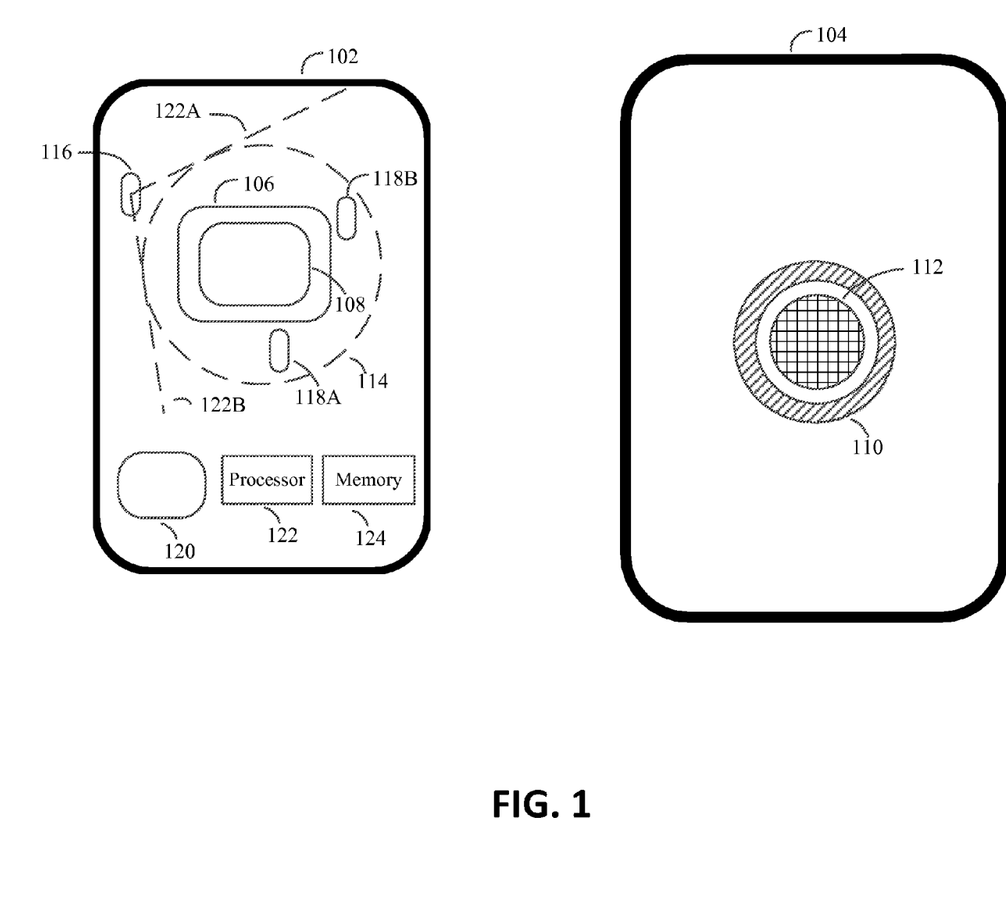
FIG. 1 is a diagram showing a device and a charging pad in accordance with example embodiments.

FIG. 1 is a diagram showing an electronic device 102 and a charging pad 104. Device 102 may be capable of communicating wirelessly via a wireless network (e.g., wireless local area network, cellular network, etc.). For example, device 102 may be a mobile phone, a smart phone, a cellular phone, a laptop computer, a mobile device, or other type of device. Charging pad 104 may be coupled to a power source for charging device 102 through magnetic induction when device 102 is placed on top of pad 104. Charging pad 104 may also be other types of devices or boxes instead of or in addition to a pad. FIG. 1 illustrates pad 104 separated from device 102 to illustrate the components of each.

Device 102 may include a ferrite shield 106, at least one receiving coil 108, at least one magnetic sensor 116, a battery 120, at least one processor 122, at least one memory 124, along with other components not depicted. Ferrite shield 106 may cover battery 120, chassis, printed circuit board, as well as other electronic components, to prevent and/or reduce undesired power leakage during charging.

Charging pad 104 may include a transmitting coil 110 and optionally may include a magnet 112, as well as a plug for connecting to an external power source. Pad 104 may also include a battery, which may be used as a source for the transmitted electrical energy. Pad 104 may include a processor and a memory or other non-transitory computer readable medium storing computer readable instructions that, when executed, cause pad 104 to perform the operations described herein with reference to pad 104. Magnet 112 may be an alignment magnet arranged to draw the charged device 102 near a predetermined position for charging. Some charging pads 104 may not include magnet 112.

To charge device 102, a user may place device 102 on top of or near pad 104 such that receiving coil 108 at least partially overlaps with transmitting coil 110. When placed overtop, charging pad 104 may cause alternating electric current to flow through transmitting coil 110. The electric current may cause the transmitting coil 110 to emit a magnetic field. Field lines of the magnetic field may pass through receiving coil 108 when positioned in proximity of transmitting coil 110, thereby inducing alternating electric current to flow through receiving coil 108 by magnetic induction. Device 102 may rectify the alternating electric current of receiving coil 108 to produce direct current to charge battery 120. Use of the electrical current resulting at receiving coil 108 is not limited to charging of battery 120. For example, other electrical components (e.g., processor, memory, etc.) of device 102 may use alternating or direct current resulting from the magnetic field, instead of drawing current from battery 120.

Magnet 112, when included in pad 104, may undesirably saturate ferrite shield 106. In some examples, ferrite shield 106 may saturate due to a combined magnetic field resulting from a magnetic field emitted by magnet 112 and a magnetic field emitted by transmitting coil 110 during inductive charging. To reduce the likelihood of ferrite shield saturating, device 102 may detect whether magnet 112 is present in pad 104. If magnet 112 is detected, device 102 may request that pad 104 reduce the amount of electrical current supplied to transmitting coil 110 to reduce the combined magnetic field.

In an example, device 102 may use magnetic sensor 116 to determine whether magnet 112 is included in pad 104. In general, device 102 may determine whether a magnet 112 is located in the proximity of device 102. These determinations may be based on detecting a magnetic field stronger than a threshold and may cause the transmitter to adjust the amount of transmitted power (based on an instruction sent to the transmitter). Magnetic sensor 116 may be a Hall sensor, a magnetometer, or other sensor configured to sense a magnetic field. More than one magnetic sensor of the same or differing types may be used. If magnet 112 is included in pad 104, magnetic sensor 116 may detect an increase in a magnetic field, relative to an ambient magnetic field, when device 102 is placed on or near pad 104. In some arrangements, the location and strength of magnet 112 may be determined and the determined value(s) may be used to lessen the effect of external magnetic fields on the device 102 (e.g., if another magnet is placed near the phone). In one or more embodiments, the power for operating the magnetic sensor and other relevant parts of device 102, which can be used to determine whether magnet 112 is located in the proximity of the device 102, may be received via magnetic induction through the receiving coil 108.

In some instances, device 102 may instruct pad 104 to adjust the amount of electrical current supplied to transmitting coil 110 to reduce the likelihood of saturating ferrite shield 106 during charging via magnetic induction. In some examples, bringing magnet 112 close to device 102 (e.g., when device 102 is in a position for charging) may saturate the ferrite shield 106. If the amount of electrical current supplied to transmitting coil 110 is reduced, such reduction may advantageously reduce the power leaked through the ferrite shield 106. For example, device 102 may compare the strength of a measured magnetic field to a threshold (e.g., when device 102 is placed on pad 104 prior to beginning charging). If the threshold is exceeded, device 102 may instruct pad 104 to reduce the amount of electrical current supplied to transmitting coil 110 during charging. If not exceeded, device 102 may instruct pad 104 to initiate charging and subsequently measure a magnetic field resulting from magnet 112 and generated by transmitting coil 110. If the subsequent measurement exceeds the threshold, device 102 may instruct pad 104 to reduce the amount of electrical current supplied to transmitting coil 110. If the magnetic field does not exceed the threshold, device 102 may permit charging pad 104 to maintain the amount of electrical current being supplied to transmitting coil 110, and/or to increase the amount of electrical current being supplied until the threshold is met.

In some embodiments, instructing the charging pad 104 to adjust the charging current may be performed according to a wireless charging control protocol, such as defined in the Qi specification by the Wireless Power Consortium. Device 102 may, for example, send the instructions as digital data by modulating the load, e.g. resistance or capacitance, of the wireless charging receiver. In another embodiment, device 102 may send the instructions over an alternative communications interface, e.g., a Bluetooth interface.

Because device 102 is able to control the magnetic field supplied by charging pad 104, ferrite shield 106 may be manufactured to be thinner than conventional shields. Even though thinner, shield 106 may be less likely to saturate and may protect internal components of device 102.

Alignment of coils 108 and 110 may also affect efficiency of magnetic induction. Generally, placing receiving coil 108 such that it is concentric with transmitting coil 110 may increase efficiency of magnetic induction. A user, however, may not be able to determine when receiving coil 108 is concentric with transmitting coil 110, because receiving coil 108 may be internal to device 102 and transmitting coil 110 may be internal to pad 104. In some instances, a user may place device 102 on pad 104 such that receiving coil 108 and transmitting coil 110 only partially overlap. The partial overlap may result in an increase of the magnetic field generated by transmitting coil 110. The charging pad 104 may also include magnet 112, which can cause an increase in the magnetic field at ferrite shield 106 (which can be saturated by the increase), and an increased magnetic field when misaligned may result in power leakage at undesired locations inside device 102. Thus, when coils 108 and 110 are sufficiently misaligned, ferrite shield 106 may not adequately protect internal components of device 102 and power leakage may cause undesired heating at particular locations within device 102.

Magnetic sensor 116 may determine how well coils 108 and 110 are aligned. For example, magnetic sensor 116 may determine a location of magnet 112 included in pad 104 relative to sensor 116 for determining how well coils 108 and 110 are aligned when device 102 is placed on pad 104. Magnetic sensor 116 may be located on device 102 apart from receiving coil 108 (as shown in FIG. 1), may be located in the middle of receiving coil 108, or at other locations on device 102. Magnet 112 may be concentric with transmitting coil 110, as shown in FIG. 1. Magnet 112 may also be positioned at other locations on pad 104 relative to transmitting coil 110, and, in such situations, pad 104 may inform device 102 of a distance between magnet 112 and transmitting coil 110 for determining alignment relative to receiving coil 108.

For example, magnetic sensor 116 may determine whether receiving coil 108 is properly aligned relative to transmitting coil 110 based on a relative distance between sensor 116 and magnet 112. Magnetic sensor 116 may be configured through instructions executed in processor 122 to search for a magnetic field emitted by magnet 112 over an angle between lines 122A-122B. Magnetic sensor 116 may determine that receiving coil 108 is properly aligned relative to transmitting coil 110 when magnet 112 is detected to be within a predetermined area 114 relative to sensor 116. For example, area 114 may be a circular region as shown in FIG. 1, or it may have other regular or irregular shapes. In one or more embodiments, a plurality of magnetic sensors 116 may be used to determine the relative locations of coils 110 and 108. Using more than one magnetic sensor 116 may provide a more accurate estimate of relative locations of coils 110 and 108.

Figure 2:
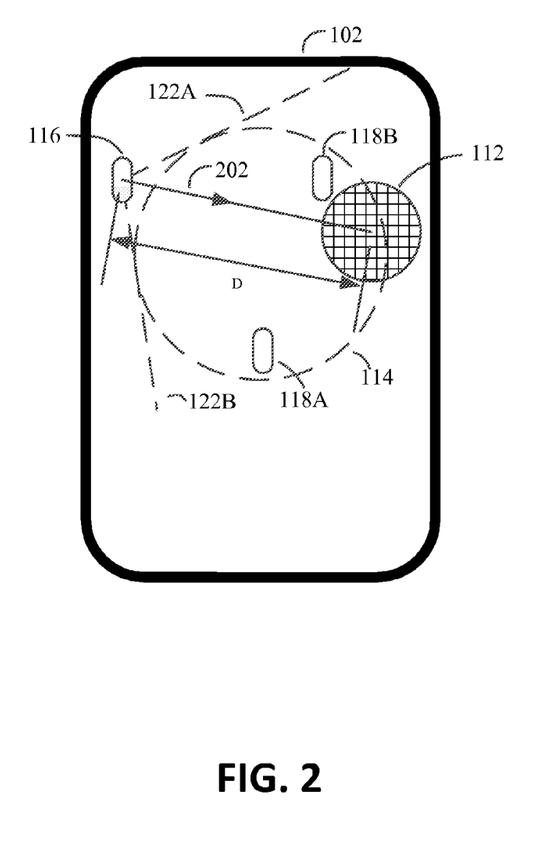
FIG. 2 illustrates an example of a device including a magnetic sensor determining whether a magnet is present within a charging pad in accordance with example embodiments.

FIG. 2 illustrates an example of determining a location of magnet 112 relative to magnetic sensor 116 in accordance with example embodiments. To prevent obscuring of the example, only magnet 112 of charging pad 104 is shown, and various components of device 102 have been omitted. Magnetic sensor 116 may detect the strength of a magnetic field emitted by magnet 112. Based on the detected magnetic field, device 102 may determine that there is a magnet in the proximity of device 102. If device 102 determines that there is a magnet in the proximity of the device, device 102 may change one or more operating parameters to be suitable for operating in the proximity of a magnet. For example, device 102 may instruct charging pad 104 to output a lower amount of electrical current to transmitting coil 110 to reduce the likelihood of saturating ferrite shield 106. If ferrite shield 106 has been saturated (such as by a magnetic field generated by magnet 112 alone or a combination of magnets and/or the transmitting coil 110), reducing the amount of electrical current supplied to transmitting coil 110 may advantageously reduce the power leaked through the ferrite shield.

In some examples, magnet 112 may have a predetermined and static magnetic flux density, or pad 104 may communicate the magnetic flux density to device 102. Based on the magnetic flux density, processor 122, using data provided by magnetic sensor 116, may estimate a direction 202 of magnet 112 relative to magnet 112 as well as distance D between sensor 116 and magnet 112. Magnetic sensor 116 (or other processor within device 102) may determine whether the magnet 112 falls within a predetermined area 114 based on direction 202 and distance D. If, as mentioned above, magnet 112 is not concentric with transmitting coil 110, device 102 may calculate using instructions executed by processor 122 the location of transmitting coil 110 relative to the determined location of magnet 112. Device 102 may then determine whether transmitting coil 110 is located within area 114.

If transmitting coil 110 is not within area 114, device 102 may inform the user to adjust placement of device 102 on charging pad 104. For example, device 102 may provide at least one of a visual and audible cue informing the user to adjust placement of device 102 on pad 104 (e.g., move device 102 one inch to the left). Alternatively, device 102 may display relative locations of the coils 108 and 110 on a screen of device 102 so that the user may adjust the relative positions. If transmitting coil 110 is determined to be within area 114, device 102 may instruct pad 104 to provide electrical current to transmitting coil 110 to begin charging of battery 120. When charging, device 102 may provide at least one of a visual and audible cue to alert the user that battery 120 is being charged.

Because charging of battery 120 may be controlled based on alignment between receiving coil 108 and transmitting coil 110, device 102 may include a smaller and/or thinner ferrite shield 106. Device 102 may thus be made smaller and/or thinner without sacrificing safety (e.g., by preventing undesired heating during charging) and while reducing the likelihood of damage to internal components due to power leakage.

In some instances, battery 120 of device 102 may be initially completely out of power and hence there may not be any power to supply to magnetic sensor 116 and processor 122 for determining presence of magnet 112 and alignment of coils 108 and 110 prior to beginning charging. In one example, pad 104 may apply an electrical current to transmitting coil 110 to begin charging of battery 120 upon detecting that device 102 has been placed on pad 104, regardless of whether pad 104 includes magnet 112 and of alignment between coils 108 and 110. Pad 104 may include a pressure sensor or other device for determining when device 102 has been placed thereon. Pad 104 may also determine presence of device 102 via communication through the transmitter coil 110 and the receiver coil 108 (e.g., in accordance with the Qi specification).

When there is sufficient electrical current to activate magnetic sensor 116, either due to battery 120 having sufficient charge or due to powering sensor 116 from electrical current received from receiving coil 108 (e.g., not from battery 120), device 102 may activate magnetic sensor 116 to detect presence of magnet and/or alignment of coils 108 and 110, as described above. Device 102 may then instruct pad 104 to adjust the amount of electrical current supplied to transmitting coil 110 or terminate charging depending on presence of magnet and/or alignment of coils 108 and 110. Alternatively or additionally, device 102 may permit pad 104 to maintain the amount of electrical current supplied in response to determining that adjustment is not required (e.g., magnetic field less than a threshold). Device 102 may also include one or more temperature sensors 118A-B to detect any undesired heating to protect the user and/or internal components of device 102. If a temperature detected by one of the temperature sensors 118A-B exceeds a threshold, device 102 may instruct pad 104 to terminate supplying electrical current to transmitting coil 110, thereby halting charging, or to reduce the amount of electrical current supplied to transmitting coil 110 to reduce a magnetic field.

In another example where battery 120 is completely out of power, pad 104 may initially supply a reduced amount of electrical current to transmitting coil 110 to begin charging of battery 120. The reduced amount of electrical current may be relative to an amount of electrical current requested by device 102 when battery 120 is not completely out of power. Pad 104 may supply transmitting coil 110 with the reduced amount of electrical current in an attempt to protect internal components of battery 120, until sufficient power is available to activate magnetic sensor 116 to detect magnet 116 and/or alignment of coils 108 and 110. For example, pad 104 may detect the presence of device 102 and attempt to communicate with device 102. In some embodiments, when device 102 does not respond (e.g., within a predetermined amount of time), pad 104 may supply a reduced amount of electrical current to transmitting coil 110. When battery 120 has sufficient charge, device 102 may activate magnetic sensor 116 to detect presence of magnet 112 and/or alignment of coils 108 and 110, as described above. Device 102 may then instruct pad 104 to adjust the electrical current supplied to transmitting coil 110 or terminate charging. Alternatively or additionally, device 102 may permit pad 104 to maintain the amount of electrical current supplied to transmitting coil 110 in response to determining that adjustment is not required. In other embodiments, pad 104 may supply electrical current to the transmitting coil only if determining a properly identified receiver coil 108 in the vicinity of pad 104.

In a further example where battery 120 is initially completely out of power, device 102 may include a separate processor and a separate power source that only supplies power to magnetic sensor 116 for determining alignment. Device 102 may include a main processor and battery 120 to control operation of some or the rest of the components of device 102, as described above and later. Based on alignment detected by magnetic sensor 116 or presence of magnet 112, the separate processor may communicate with pad 104 to control electrical current levels provided to transmitting coil 110. In such an example, device 102 may determine alignment even though battery 120 is out of power.

Figure 3:
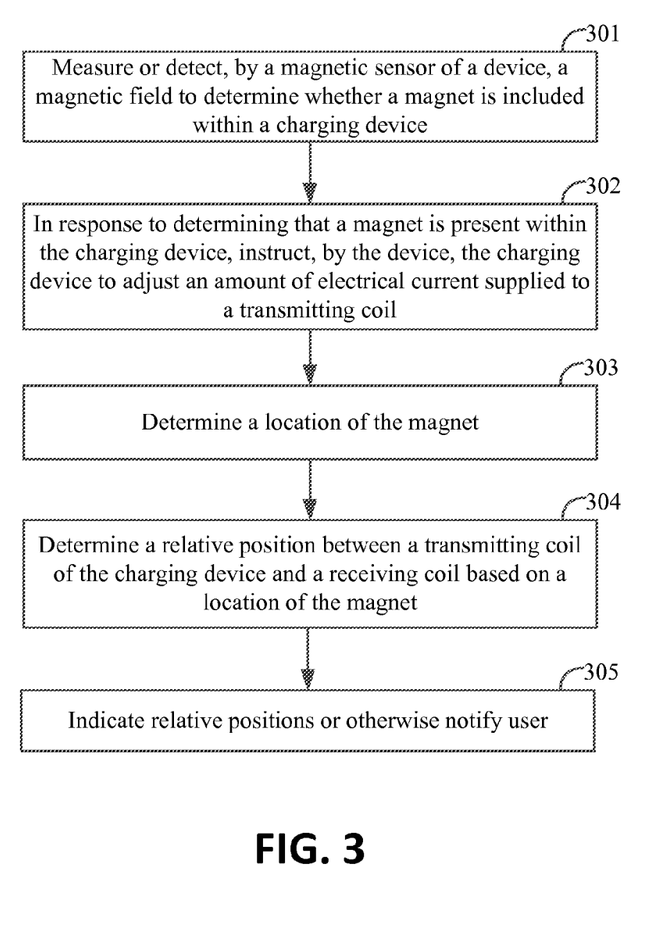
FIG. 3 is a flow chart showing operations performed by a device in accordance with example embodiments.

FIG. 3 is a diagram showing operations performed by a device in accordance with example embodiments. In some embodiments, one or more steps indicated in FIG. 3 may be omitted, rearranged or replaced with different steps. Other steps might also or alternatively be added. The steps indicated in FIG. 3 may be performed by a processor, an application specific integrated circuit (ASIC) and/or other hardware within device 102. For convenience, performance of operations by such hardware will be generically described as performance of operations by device 102. Such operations may be performed as the result of executing machine-executable instructions stored within one or more memories of device 102 and/or executing instructions that are stored as hard-coded dedicated logic.

In step 301, a magnetic sensor 116 of device 102 may measure or otherwise detect a magnetic field to determine whether a magnet is included within charging pad 104. For example, device 102 may include means for measuring a magnetic field to determine whether a magnet is included within charging pad 104. In alternative or additional examples, device 102 may include other means for detecting a magnetic field. In some cases, magnet 112 may have a static magnetic flux density. Device 102 may include receiving coil 108 for charging of a battery 120 of device 102 based on magnetic induction.

In step 302, device 102 may, in response to determining that a magnet is present within charging pad 104, instruct pad 104 to adjust an amount of electrical current supplied to a transmitting coil 110. For example, device 102 may include means for instructing pad to adjust an amount of electrical current supplied to transmitting coil 110. Such means may include radio transmission or other means of communication, such as, for example, communication via modulating the magnetic field between the transmitter and receiver coils.

In block 303, device 102 may determine a location of magnet 112. For example, device 102 may include means for determining a location of magnet 112. In an example, device 102 may process data on the magnetic field received from magnetic sensor 116.

In step 304, device 102 may determine a relative position between a transmitting coil 110 of charging pad 104 and receiving coil 108 based on the location of magnet 112. For example, device 102 may include means for determining a relative position between coils 108 and 110. Device 102 may use the detected position of magnet 112 to control whether pad 104 provides electrical current to transmitting coil 110, as well as the amount of current supplied, for charging of a battery 120 via magnetic induction.

In step 305, device 102 may indicate relative positions between coils 108 and 110 or otherwise notify user of coil alignment. To assist the user, device 102 may show relative positions of coils 108 and 110 on a display screen to assist the user with coil alignment. For example, device 102 may instruct a user to reposition device 102 on pad 104 to better align coils 108 and 110 based on the detected position of magnet 112.

The instructing of the charging device to adjust the amount of electrical current supplied to the transmitting coil in block 302 may be based on the relative position between coils 108 and 110, or may be a separate instruction independent of whether pad 104 includes magnet 112. For example, if coils 108 and 110 are misaligned, device 102 may instruct pad 104 to supply less electrical current to reduce undesired power leakage within device 102. Device 102 may also output at least one of an audible and visual instruction to instruct the user to adjust alignment between coils 108 and 110. If coils 108 and 110 are determined to be sufficiently aligned, device 102 may instruct pad 104 to maintain or increase the amount of electrical current being supplied. The method may end, may return to a previous step, or may repeat one or more times.

Figure 4:
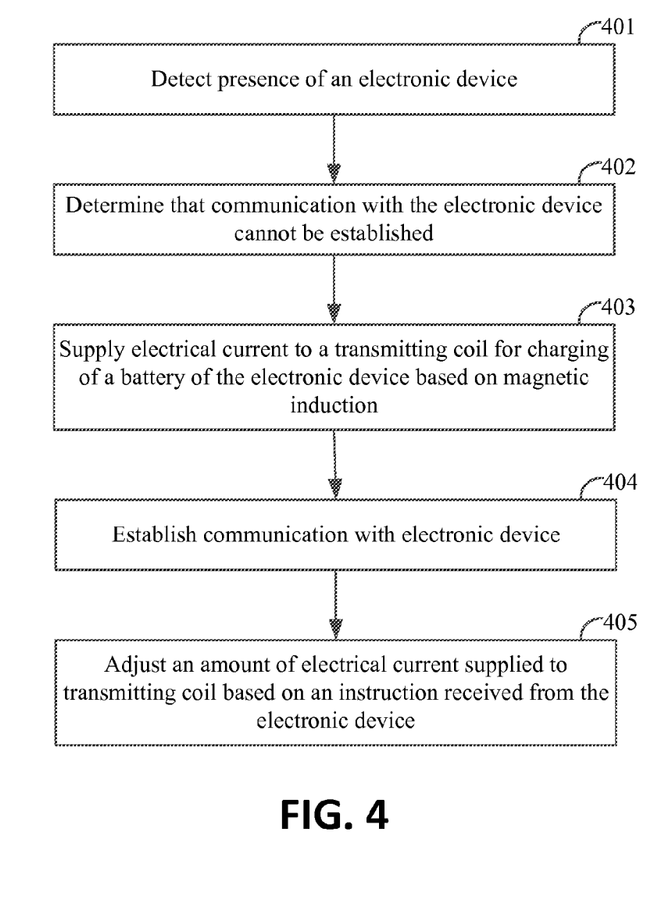
FIG. 4 is a flow chart showing operations performed by a charging pad in accordance with example embodiments.

FIG. 4 is a diagram showing operations performed by a charging device in accordance with example embodiments. In some embodiments, one or more steps indicated in FIG. 4 may be omitted, rearranged or replaced with different steps. Other steps might also or alternatively be added. The steps indicated in FIG. 4 may be performed by a processor, an application specific integrated circuit (ASIC) and/or other hardware within charging pad 104. For convenience, performance of operations by such hardware will be generically described as performance of operations by charging pad 104. Such operations may be performed as the result of executing machine-executable instructions stored within one or more memories of charging device 104 and/or executing instructions that are stored as hard-coded dedicated logic.

In step 401, charging pad 104 may detect presence of electronic device 102. For example, pad 104 may include means (e.g., a pressure sensor) for determining that device 102 has been placed thereon. Alternatively, transmitter coil 110 can detect when the receiver coil 108 is in the vicinity by communication through the coil interface. Transmitter coil 110 may, for example, transmit a ping signal and determine whether it can detect a response due to resonance of receiver coil 108. Then, the receiver coil 108 may transfer some more initialization or identification information and transmitter coil 110 may start to deliver power to the receiver side.

In step 402, charging pad 104 may determine that communication with the electronic device 102 cannot be established. For example, charging pad 104 may include means (e.g., a transceiver) for attempting to communicate with device 102 and for determining that communication with device 102 cannot be established. In an example, after detecting the presence of device 102, pad 104 may attempt to communicate with device 102. Due to battery 120 being sufficiently drained, device 102 may be in a powered off state. After not receiving a response within a predetermined amount of time, pad 104 may determine that communication with the electronic device cannot be established.

In step 403, charging pad 104 may supply electrical current to transmitting coil 110 for charging of battery 120 of device 102 based on magnetic induction. In an example, pad 104 may include means for supplying electrical current to transmitting coil 110. The amount of supplied electrical current may be lower than the amount of electrical current supplied to transmitting coil 110 responsive to when communication can be established. In another example, the amount of supplied electrical current may be substantially the same as the amount of electrical current supplied to transmitting coil 110 responsive to when communication can be established. In another example the charging pad may supply electrical current to transmitting coil 110 only after successful identification of device 102. The initial amount of supplied electrical current may be however lower than the amount of electrical current supplied to transmitting coil 110 responsive to when communication can be established.

In some embodiments, supplying electrical current to transmitting coil 110 may be based on whether receiver coil 108 can be detected in the vicinity. In an example, only when the receiver coil 108 is detected will electrical current be supplied to the transmitting coil 110. In some arrangements, supplying electrical current to transmitting coil 110 based on whether receiver coil 108 can be detected may be used as an alternative to steps 402 or 403, though a similar means for supplying electrical current to transmitting coil 110 may be used. In others, supplying electrical current to transmitting coil 110 based on whether receiver coil 108 can be detected may be used in addition to steps 402 and 403, such as determining whether receiver coil 108 can be detected in conjunction with step 402 and supplying electrical current to transmitting coil 110 based on magnetic induction (step 403) and whether the receiver coil 108 can be detected.

In block 404, charging pad 104 may establish communication with device 102. For example, when battery 120 has been sufficiently charged, device 102 may be capable of communicating and may send a communication informing pad 104 that device 102 can now communicate. In some arrangements, power may be taken directly from the receiver coil 108. In such arrangements, device 102 may be capable of communicating and may send the communication to charging pad 104 without waiting for battery 120 to be sufficiently charged.

In block 405, pad 104 may receive an instruction from device 102 and may adjust an amount of electrical current supplied to transmitting coil 110. For example, the instruction may be to increase or decrease the amount of electrical current supplied to transmitting coil 110. In another example, the instruction may include information on relative position between coils 108 and 110, and pad 104 may determine whether to adjust the amount of electrical current supplied to transmitting coil 110 based on the relative position. The method may end, may return to a previous step, or may repeat one or more times.

Figure 5:
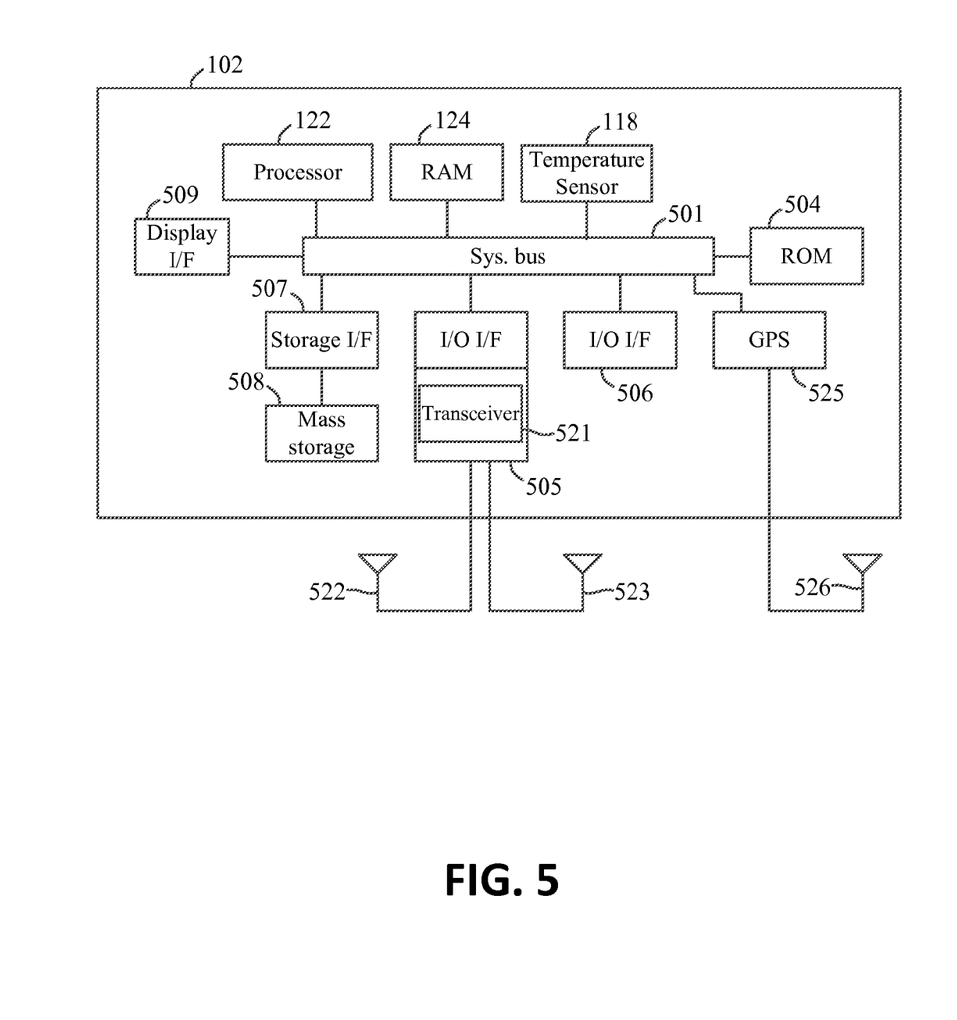
FIG. 5 is a diagram of an exemplary device in accordance with example embodiments.

Various types of computers or other processors can be used to implement a device such as device 102 or pad 104 according to various embodiments. FIG. 5 shows an exemplary electronic device 102 in accordance with example embodiments. Device 102 includes a system bus 501 which operatively connects one or more processors 122, at least one memory (e.g., random access memory) 124, at least one temperature sensor 118, read-only memory 504, input output (I/O) interfaces 505 and 506, storage interface 507, display interface 509 and global positioning system (GPS) chip 525. Storage interface 507 in turn connects to a mass storage 508. Interface 505 may include a transceiver 521, antennas 522 and 523, and other components for communication in the radio spectrum. Interface 506 and/or other interfaces (not shown) may similarly include a transceiver, one or more antennas, and other components for communication in the radio spectrum, and/or hardware and other components for communication over wired or other types of communication media. GPS chip 525 includes a receiver, an antenna 526 and hardware and/or software configured to calculate a position based on GPS satellite signals.

Mass storage 508 may be a hard drive, flash memory or other type of non-volatile storage device. Processor(s) 122 may be, e.g., an ARM-based processor such as a Qualcomm Snapdragon or an x86-based processor such as an Intel Atom or Intel Core. Device 102 may also include a touch screen (not shown) and physical keyboard (also not shown). A mouse or keypad may alternately or additionally be employed. A physical keyboard might optionally be eliminated. Device 102 may optionally include or be attached to one or more image capture devices.

Device 102 may optionally include or be attached to one or more card readers, DVD drives, floppy disk drives, hard drives, memory cards, or ROM devices whereby media machine-readable instructions, including program code or other instructions for performing operations and communications described herein, is optionally inserted for the purpose of loading instructions onto the computer. Further, such machine-readable instructions may optionally be loaded onto the computer via one or more of I/O interfaces 505 and 506. Charging pad 104 may include some or all of the components shown in FIG. 5.

Any indicated division of operations among particular software modules or devices is for purposes of illustration, and alternate divisions of operation are possible. Accordingly, any operations indicated to be performed by one software module are according to an alternative implementation instead performed by a plurality of software modules. Similarly, any operations indicated to be performed by a plurality of modules may according to an alternative implementation be performed by a single module.

Further, operations indicated to be performed by device 102 or pad 104 may according to an alternative implementation instead be performed by a plurality of computers. Moreover, peer-to-peer, cloud, and/or grid computing techniques are optionally employed. Additionally, implementations may include remote communication among software modules. Exemplary remote communication techniques include Simple Object Access Protocol (SOAP), Java Messaging Service (JMS), Remote Method Invocation (RMI), Remote Procedure Call (RPC), sockets, and pipes.

Operations discussed herein may be implemented via hardware that contains hard-coded instructions (e.g., logic gates and other structures) configured to perform operations and communications described herein. Examples of such implementation via hardware include the use of one or more of integrated circuits, specialized hardware, chips, chipsets, application-specific integrated circuits (ASICs), and field-programmable gate arrays (FPGAs). Machine-executable instructions can include hard-coded instructions.

The foregoing description of embodiments has been presented for purposes of illustration and description. The foregoing description is not intended to be exhaustive or to limit embodiments to the precise form explicitly described or mentioned herein. Modifications and variations are possible in light of the above teachings or may be acquired from practice of various embodiments.

The invention claimed is:

1. A method comprising:
    detecting, by a device configured to charge a battery based on magnetic induction of a receiving coil, a magnetic field; and
    while alternating or direct current results from magnetic induction of the receiving coil and based on determining that a magnet is present within a charging device based on the magnetic field, instructing, by the device, the charging device to supply a lower amount of electrical current to a transmitting coil.

2. The method of claim 1, further comprising:
    responsive to detecting that a temperature exceeds a threshold, instructing the charging device to further lower the amount of electrical current supplied to the transmitting coil.

3. The method of claim 1, further comprising determining a location of the magnet.

4. The method of claim 3, further comprising:
    determining a relative position between the transmitting coil and the receiving coil based on the location of the magnet; and
    instructing the charging device to adjust the amount of electrical current supplied to the transmitting coil based on the relative position.

5. The method of claim 1, wherein determining that the magnet is present within the charging device is based on comparing a measured strength of the magnetic field to a threshold, and wherein instructing the charging device to supply the lower amount of electrical current to the transmitting coil is based on the comparing.

6. The method of claim 1, further comprising determining that the magnet is located within a predetermined area relative to at least one magnetic sensor.

7. The method of claim 1, further comprising providing audible and/or visual output to indicate that placement of the device relative to the charging device should be adjusted.

8. An apparatus comprising:
a receiving coil;
a battery configured to be charged based on magnetic induction of the receiving coil;
at least one processor; and
memory storing executable instructions configured to, with the at least one processor, cause the apparatus at least to:
  detect a magnetic field; and
  while alternating or direct current results from magnetic induction of the receiving coil and based on determining that a magnet is present within a charging device based on the magnetic field, instruct the charging device to supply a lower amount of electrical current to a transmitting coil.

9. The apparatus of claim 8, wherein the executable instructions are configured to, with the at least one processor, cause the apparatus to:
determine a location of the magnet;
determine a relative position between the transmitting coil and the receiving coil based on the location of the magnet; and
instruct the charging device to adjust the amount of electrical current supplied to the transmitting coil based on the relative position.

10. The apparatus of claim 8, wherein determining that the magnet is present within the charging device is based on a comparison of a measured strength of the magnetic field to a threshold, and wherein causing the apparatus to instruct the charging device to supply the lower amount of electrical current to the transmitting coil is based on the comparison.

11. The apparatus of claim 8, wherein the executable instructions are configured to, with the at least one processor, cause the apparatus to determine a direction of the magnet relative to a magnetic sensor and/or a distance between the magnet and the magnetic sensor.

12. The apparatus of claim 8, wherein the executable instructions are configured to, with the at least one processor, cause the apparatus to provide audible and/or visual output to indicate that placement of the apparatus relative to the charging device should be adjusted.

13. The apparatus of claim 8, wherein the executable instructions are configured to, with the at least one processor, cause the apparatus to determine that the magnet is located within a predetermined area relative to at least one magnetic sensor.

14. The apparatus of claim 8, wherein the executable instructions are configured to, with the at least one processor, cause the apparatus to:
responsive to determining that a temperature exceeds a threshold, instruct the charging device to further lower the amount of electrical current supplied to the transmitting coil.

15. The apparatus of claim 8, further comprising:
at least one magnetic sensor configured to detect the magnetic field.

16. One or more non-transitory machine-readable media storing executable instructions that, when executed, cause an apparatus at least to:
detect a magnetic field, wherein the apparatus is configured to charge a battery based on magnetic induction of a receiving coil; and
while alternating or direct current results from magnetic induction of the receiving coil and based on determining that a magnet is present within a charging device based on the magnetic field, instruct the charging device to supply a lower amount of electrical current to a transmitting coil.

17. The one or more non-transitory machine-readable media of claim 16, wherein the executable instructions, when executed, cause the apparatus to:
responsive to detecting that a temperature exceeds a threshold, instruct the charging device to further lower the amount of electrical current supplied to the transmitting coil.

18. The one or more non-transitory machine-readable media of claim 16, wherein determining that the magnet is present within the charging device is based on a comparison of a measured strength of the magnetic field to a threshold, and wherein causing the apparatus to instruct the charging device to supply the lower amount of electrical current to the transmitting coil is based on the comparison.

19. The one or more non-transitory machine-readable media of claim 16, wherein the executable instructions, when executed, cause the apparatus to:
determine a location of the magnet;
determine a relative position between the transmitting coil and the receiving coil based on the location of the magnet; and
instruct the charging device to adjust the amount of electrical current supplied to the transmitting coil based on the relative position.

20. The one or more non-transitory machine-readable media of claim 16, wherein the executable instructions, when executed, cause the apparatus to determine a direction of the magnet relative to at least one magnetic sensor and/or a distance between the magnet and the least one magnetic sensor.

21. The one or more non-transitory machine-readable media of claim 16, wherein the executable instructions, when executed, cause the apparatus to determine that the magnet is located within a predetermined area relative to at least one magnetic sensor.

22. The one or more non-transitory machine-readable media of claim 16, wherein the executable instructions, when executed, cause the apparatus to provide audible and/or visual output to indicate placement of the apparatus relative to the charging device should be adjusted.

* * * * *